(12) United States Patent
Ordody et al.

(10) Patent No.: US 8,407,619 B2
(45) Date of Patent: Mar. 26, 2013

(54) METHOD AND APPARATUS FOR SELECTING AND HIGHLIGHTING OBJECTS IN A CLIENT BROWSER

(75) Inventors: Gyorgy Ordody, San Francisco, CA (US); Benjamin D. Cochran, Corte Madera, CA (US); Junjie Gao, Shanghai (CN); JiChao Li, Shanghai (CN)

(73) Assignee: Autodesk, Inc., San Rafael, CA (US)

( * ) Notice: Subject to any disclaimer, the term of this patent is extended or adjusted under 35 U.S.C. 154(b) by 509 days.

(21) Appl. No.: 12/512,856

(22) Filed: Jul. 30, 2009

(65) Prior Publication Data

US 2010/0031196 A1 Feb. 4, 2010

Related U.S. Application Data

(60) Provisional application No. 61/084,894, filed on Jul. 30, 2008.

(51) Int. Cl.
*G06F 3/48* (2006.01)

(52) U.S. Cl. ........ 715/810; 345/581; 345/619; 345/629; 705/3; 382/235; 715/744; 715/207

(58) Field of Classification Search .................... 715/810
See application file for complete search history.

(56) References Cited

U.S. PATENT DOCUMENTS

| | | | | |
|---|---|---|---|---|
| 4,792,981 A * | 12/1988 | Cahill et al. | ................. | 382/235 |
| 5,581,635 A * | 12/1996 | Zhu et al. | ................. | 382/245 |
| 5,642,167 A * | 6/1997 | Wallace et al. | ......... | 375/240.24 |
| 5,915,098 A * | 6/1999 | Palmer et al. | ................. | 709/247 |
| 6,282,363 B1 * | 8/2001 | Yagi et al. | ................. | 386/279 |
| 6,366,825 B1 * | 4/2002 | Smalley et al. | ............... | 700/120 |
| 6,601,047 B2 * | 7/2003 | Wang et al. | .................... | 705/75 |
| 7,545,987 B2 * | 6/2009 | Takano et al. | ................. | 382/232 |
| 8,095,434 B1 * | 1/2012 | Puttick et al. | ............... | 705/26.9 |
| 2002/0015042 A1 * | 2/2002 | Robotham et al. | ............ | 345/581 |
| 2002/0112237 A1 * | 8/2002 | Kelts | ................. | 725/39 |
| 2003/0046082 A1 * | 3/2003 | Siegel | ............. | 704/270 |
| 2003/0179193 A1 * | 9/2003 | Adams, Jr. | ................. | 345/419 |
| 2004/0008213 A1 * | 1/2004 | O'Neill et al. | ................ | 345/670 |
| 2004/0071320 A1 * | 4/2004 | Pfister | ............. | 382/110 |
| 2004/0172615 A1 * | 9/2004 | Beltran et al. | ................ | 717/113 |
| 2004/0250204 A1 * | 12/2004 | Isaacson | ....................... | 715/517 |
| 2004/0264786 A1 * | 12/2004 | McElvain | ..................... | 382/233 |
| 2005/0030321 A1 * | 2/2005 | Anwar | ............. | 345/629 |
| 2005/0031217 A1 * | 2/2005 | Takano et al. | ................. | 382/236 |
| 2005/0091111 A1 * | 4/2005 | Green et al. | ................... | 705/14 |

(Continued)

OTHER PUBLICATIONS http://www.opengl.org/resources/faq/technical/selection.htm. "20 Picking and Using Selection". pp. 1-3, 2009.

(Continued)

*Primary Examiner* — William Bashore
*Assistant Examiner* — Reza Nabi
(74) *Attorney, Agent, or Firm* — Gates & Cooper LLP (57) ABSTRACT

A computer implemented method, apparatus, article of manufacture and storage medium, provide the ability to select and highlight objects. A rendered image (containing one or more rendered objects) is displayed in a client browser on a client computer. A run length encoded (RLE) selection buffer is received, from a server across a network, into the client browser. The selection buffer provides a mapping of each pixel from the rendered image to rendered objects. User input is accepted that identifies a location of a cursor with respect to the rendered image. A determination is made, on the client computer, regarding which of the rendered objects has been selected based on the user input and the RLE selection buffer. The selected rendered object is then displayed in a visually distinguishable manner.

18 Claims, 6 Drawing Sheets

U.S. PATENT DOCUMENTS

| | | | | |
|---|---|---|---|---|
| 2006/0212816 A1* | 9/2006 | Koskimies | | 715/744 |
| 2007/0080958 A1* | 4/2007 | Chithambaram et al. | | 345/418 |
| 2007/0229543 A1* | 10/2007 | Liepa et al. | | 345/647 |
| 2007/0245090 A1* | 10/2007 | King et al. | | 711/129 |
| 2007/0263007 A1* | 11/2007 | Robotham et al. | | 345/581 |
| 2007/0280165 A1* | 12/2007 | Doshi et al. | | 370/331 |
| 2008/0262717 A1* | 10/2008 | Ettinger | | 701/206 |
| 2009/0024590 A1* | 1/2009 | Sturge et al. | | 707/3 |
| 2009/0024597 A1* | 1/2009 | Imielinski | | 707/4 |
| 2009/0060325 A1* | 3/2009 | Shiraishi | | 382/166 |
| 2009/0125544 A1* | 5/2009 | Brindley | | 707/102 |
| 2009/0164250 A1* | 6/2009 | Hamilton et al. | | 705/3 |
| 2009/0172511 A1* | 7/2009 | Decherd et al. | | 715/207 |
| 2009/0287572 A1* | 11/2009 | Whelan | | 705/14.55 |
| 2010/0021061 A1* | 1/2010 | Campbell | | 382/180 |
| 2010/0194753 A1* | 8/2010 | Robotham et al. | | 345/428 |
| 2010/0312821 A1* | 12/2010 | Bannoura et al. | | 709/203 |

OTHER PUBLICATIONS http://en.wikipedia.org/wiki/Thin_client. "Thin client". p. 1, 2009.
http://en.wikipedia.org/wiki/Canvas_(HTML_element). "Canvas (HTML element)". pp. 1-2, Jun. 18, 2009.
http://en.wikipedia.org/wiki/Vector_Markup_Language. "Vector Markup Language". pp. 1-3, Jun. 12, 2009.
http://glprogramming.com/red/chapter13.html. Chapter 13: "Selection and Feedback". OpenGL Programming Guide; pp. 1-22, 2009.
http://glprogramming.com/red/about.html. "The Official Guide to Learning OpenGL, Version 1.1". Open GL Programming Guide; pp. 1-6, 2009.

* cited by examiner

METHOD AND APPARATUS FOR SELECTING AND HIGHLIGHTING OBJECTS IN A CLIENT BROWSER

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/084,894, filed Jul. 30, 2008, by Gyorgy Ordody, Benjamin D. Cochran, Junjie Gao, and Jichao Li, entitled "Method and Apparatus for Providing Selecting and Highlighting in a Web Application Using Run Length Encoding to Compress an Object Buffer and Writing It as JavaScript Object Notation (JSON™),".

BACKGROUND OF THE INVENTION

1. Field of the Invention

The present invention relates generally to selecting and highlighting objects in a client browser. More specifically, the invention relates to a method, apparatus, system, and article of manufacture for the selection and highlighting of dynamically rendered 3D objects in a web application using run length encoding to compress an object selection buffer.

2. Description of the Related Art

When browsing the Internet using a client browser/web browser, images (two-dimensional [2D] and/or three-dimensional [3D]) having embedded objects are often displayed. It is often desirable for a user to select and/or highlight these embedded objects in the web browser using a cursor control device (e.g., a computer mouse). Existing browser based solutions track mouse movements by round tripping between the server and client. Other solutions install thick client applications to process the selection and highlighting. However, such round tripping or thick client applications require significant processing by both the client and server and consume resources and time to conduct. These problems may be better understood with a more detailed description of client web applications and selection/highlighting in such applications.

Web applications may often attempt to provide users with the ability to select and highlight objects in a 3D dynamically generated scene. Responsiveness is critical for selection and highlighting that provides a good user experience. As the user moves the mouse, he/she needs to see objects highlighted or distinguished. When a user clicks a cursor control device, he/she needs to select an object with little or no delay.

Traditionally, a "Zero Client" application is a hardware only appliance that runs no software at all but directly connects the user to a virtualized desktop. As used herein, a zero client application may be viewed as an application executing on a client with limited processing capabilities. In such a client computer, functionality and processing may provide a web browser application. However, the ability to execute processing or install add-ins in such a web browser may be limited (e.g., by the hardware). Accordingly, zero client applications may leverage a web browser on a client's computer to render marked-up content and to run a scripting language based application (e.g., JavaScript™) without installing browser plug-ins. This is an environment with limited functionality and performance.

Scripting languages such as JavaScript™ are interpreted languages that run slow and isolated. When more processing is needed, the scripting languages executing in the browser can leverage server side power and resources. However, server requests (i.e., from the client) also have a cost depending on the user Internet connection, distance between the client and the server, and other factors that may result in a one second (or longer) penalty for going to the server (or for performing a round trip operation).

Operations like selecting and highlighting objects in a rendered 3D scene are difficult in the browser. Traditionally, selecting an object can be done multiple ways. One way is to install a thick client application. However, thick client applications may not be possible on Zero Client computers and even if possible would require significant processing time and resources.

A second way to select and highlight objects is to utilize a selection buffer. A selection buffer is a rendering, but instead of coloring each pixel based on a lighting equation, the output is an identification (ID) of the rendered object. Selection is done by reading the value (which is a color value in a standard rendering) at an x and y location in the selection buffer. The read value is the object ID.

In the same way the server is used to render the 3D scene, it would be good if the server could provide this selection buffer to the client (e.g., for use on a client with limited processing capabilities). However, such a server-provided selection buffer creates a problem as the selection buffer needs to be processed quickly in the scripting language application as the user moves the cursor control device and clicks a cursor control device button. Many scripting language applications (e.g., JavaScript™) cannot handle the size of a raw selection buffer even when the scene size is as small as 640×480 pixels. In this regard, a raw selection buffer is too slow to transfer over the wide area network (WAN) and is too large to use with a scripting language application in a browser.

Accordingly, what is needed is a client-browser based capability to quickly and efficiently select and highlight one or more objects in a 2D or 3D image.

SUMMARY OF THE INVENTION

One or more embodiments of the invention allow selection and highlighting of objects in a 3D scene without having to round trip between the client and server and without installing a thicker client. Such a capability provides a more responsive user interface experience and avoids the download, the install, and the security risk for utilizing a server based application on a client computer.

To provide such functionality, embodiments of the invention utilize a selection buffer that is run length encoded. The selection buffer is then processed and utilized during the object selection/highlighting actions.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide the ability to select and highlight objects in a 3D scene displayed on a client browser without having to round trip between the client and the server. A selection buffer is prepared by a server and compressed using run length encoding (RLE). The compressed selection buffer is then used by the client to easily and dynamically provide selection and highlighting capabilities to a user in real time as the user moves the mouse over objects in a buffer.

Hardware Environment

Figure 1:
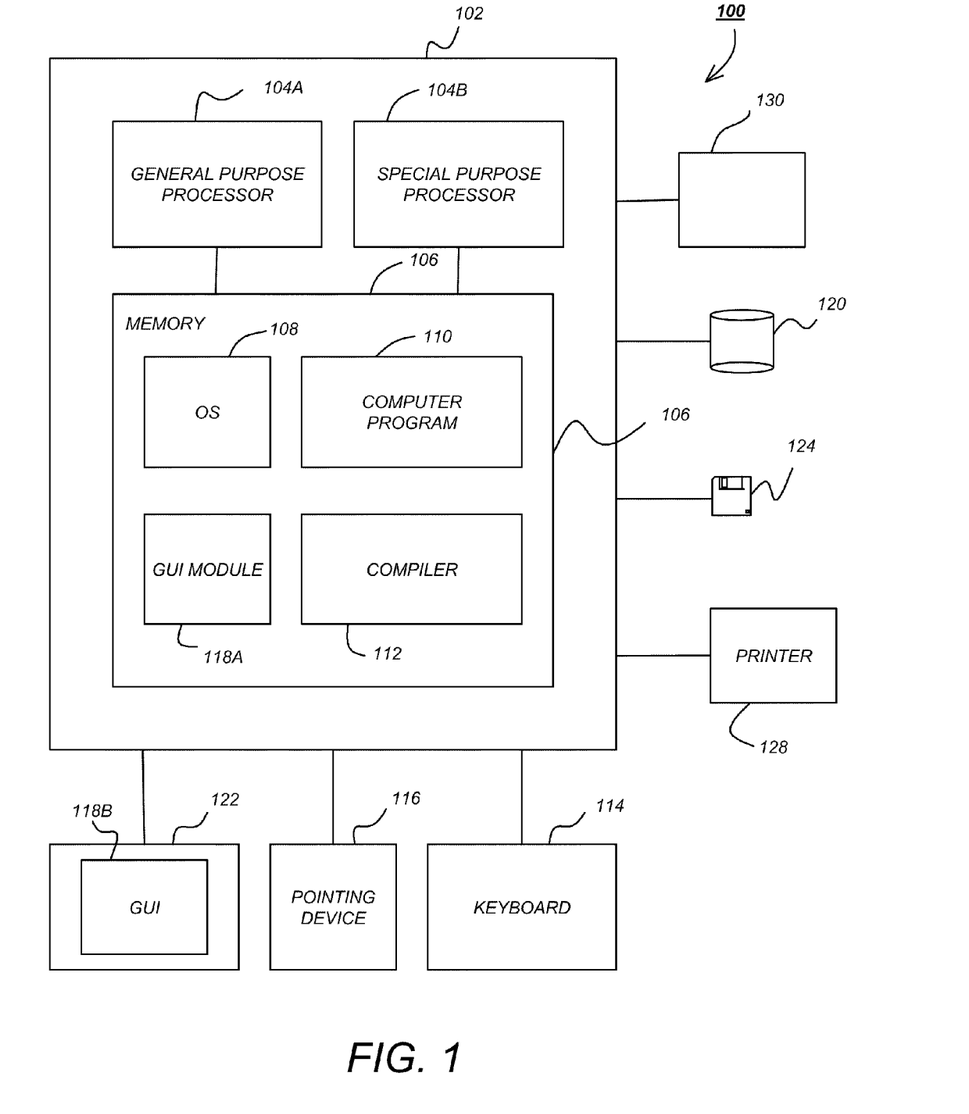
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that a user computer 102 may include portable devices such as cell phones, notebook computers, pocket computers, or any other device with suitable processing, communication, and input/output capability.

Figure 2:
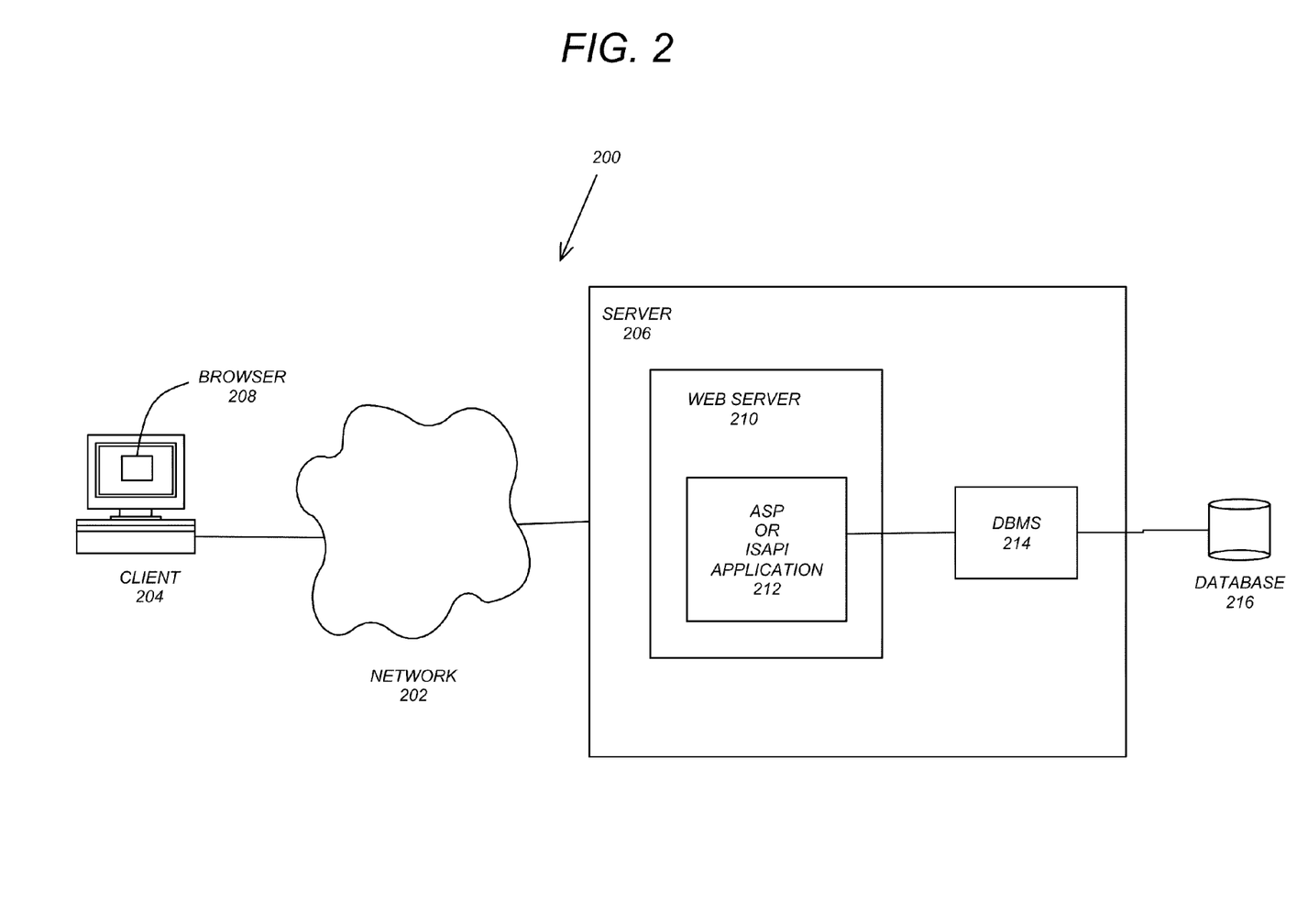
FIG. 2 schematically illustrates a further network environment in accordance with one or more embodiments of the invention.

FIG. 2 schematically illustrates a further network environment in accordance with one or more embodiments of the invention, and more particularly, illustrates a typical distributed computer system 200 using a network 202 to connect client computers 204 to server computers 206 (both client computer 204 and server computers 206 may comprise the computer 102 described above). Alternatively, client computers may be zero-client computers with minimal processing and storage capabilities. A typical combination of resources may include a network 202 comprising the Internet, LANs (local area networks), WANs (wide area networks), SNA networks (system network architecture networks), or the like, clients 204 that are personal computers or workstations, and servers 206 that are personal computers, workstations, minicomputers, or mainframes.

A network 202 such as the Internet connects clients 204 to server computers 206. Additionally, network 202 may utilize radio frequency (RF) to connect and provide the communication between clients 204 and servers 206. Clients 204 may execute a client application or Web browser 208 and communicate with server computers 206 executing Web servers 210. Such a Web browser 208 is typically a program such as NETSCAPE NAVIGATOR™, MICROSOFT INTERNET EXPLORER™, or MOZILLA FIREFOX™. Further, the software executing on clients 204 may be downloaded from server computer 206 to client computers 204 and installed as a plug in or ActiveX control of a Web browser. Accordingly, clients 204 may utilize ActiveX components/component object model (COM) or distributed COM (DCOM) components to provide a user interface on a display of client 204. The Web server 210 is typically a program such as Microsoft's Internet Information Server. Alternatively, as described above, the client computer 204 may provide an environment for executing a zero-client application that leverages a web browser to render marked-up content and to run a scripting application (e.g., JavaScript™) without installing browser plug-ins. Such a configuration provides an environment with limited functionality and performance.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 204 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize Microsoft's Transaction Server (MTS) to access required data stored in database 216 via an interface such as ADO (Active Data Objects), OLE DB (Object Linking and Embedding DataBase), or ODBC (Open DataBase Connectivity).

Generally, these components 100-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.
Software Embodiments As described above, embodiments of the invention may be implemented using a zero-client application that leverages a web browser 208 on a client computer 204 to render marked-up content, to select and highlight objects, and to run scripting applications without installing browser plug-ins. Further, since a raw selection buffer is too slow to transfer over a network 202 and is too large to use with a scripting language in a browser 208, embodiments of the invention utilize a selection buffer that is run length encoded and written out as native scripting language objects (e.g., JavaScript™ objects).

The selection buffers are compressed using a Run Length Encoding (RLE) compression technique. RLE is a simple form of lossless compression. Sequences or runs of same values are compressed into the length of the run and the value being compressed. For example, "AAAAAAAAABBBBB-CCC" compress to "9A5B3C". The original data has 17 characters and the compressed data has only 6. RLE compression may not provide satisfactory results for rendered images, but provides many advantages and works well for selection buffers.

The RLE data is sent to the client 204 from the server 206. The format of the data may be in a data interchange format such as JavaScript Object Notation (JSON)™. JSON™ is simply a text-based data interchange format used to transmit data that is defined as a subset of the JavaScript™ scripting language. Alternative interchange formats may be used in accordance with embodiments of the invention. In addition, the RLE data may be transmitted from the server 206 to the client 204 using JSON on top of HTTP (hyper text transfer protocol). HTTP offers a second level of compression for the transmission process. Such compression may be provided using the gzip (GNU Zip™) or Zip™ applications. Gzip or Zip works well on top of RLE typically reducing the number of transmitted bytes by more than half. This extra compression on top of RLE can even exceed 5:1. Accordingly, embodiments of the invention may utilize both RLE and HTTP compression methodologies to compress the data for transmission to the client 204.

The application (e.g., written in a scripting language) on the client 204 makes a request to the server 206 and the server 206 responds with data in a data interchange format (e.g., JSON™). The format may utilize JavaScript™ scripting language object literal notation. For one or more embodiments, the server 206 returns data in associative arrays (e.g., actual JavaScript™ arrays and not in the object literal notation). In this regard, JSON™ may be not needed. Instead, an alternative object, scripting language, or interchange format may be utilized.

The client browser 208 is able to request the RLE compressed data once and then execute responsive user selection and highlighting into a dynamically rendered 3D scene by performing hit testing on the data. Hit testing is a mechanism used to determine where the cursor is located during the selection process. Such hit selection may be performed merely by hovering a cursor over a location or by a user clicking a button of a cursor control device, or activating a selection capability (e.g., tapping a stylus on a tablet).

Figure 3:
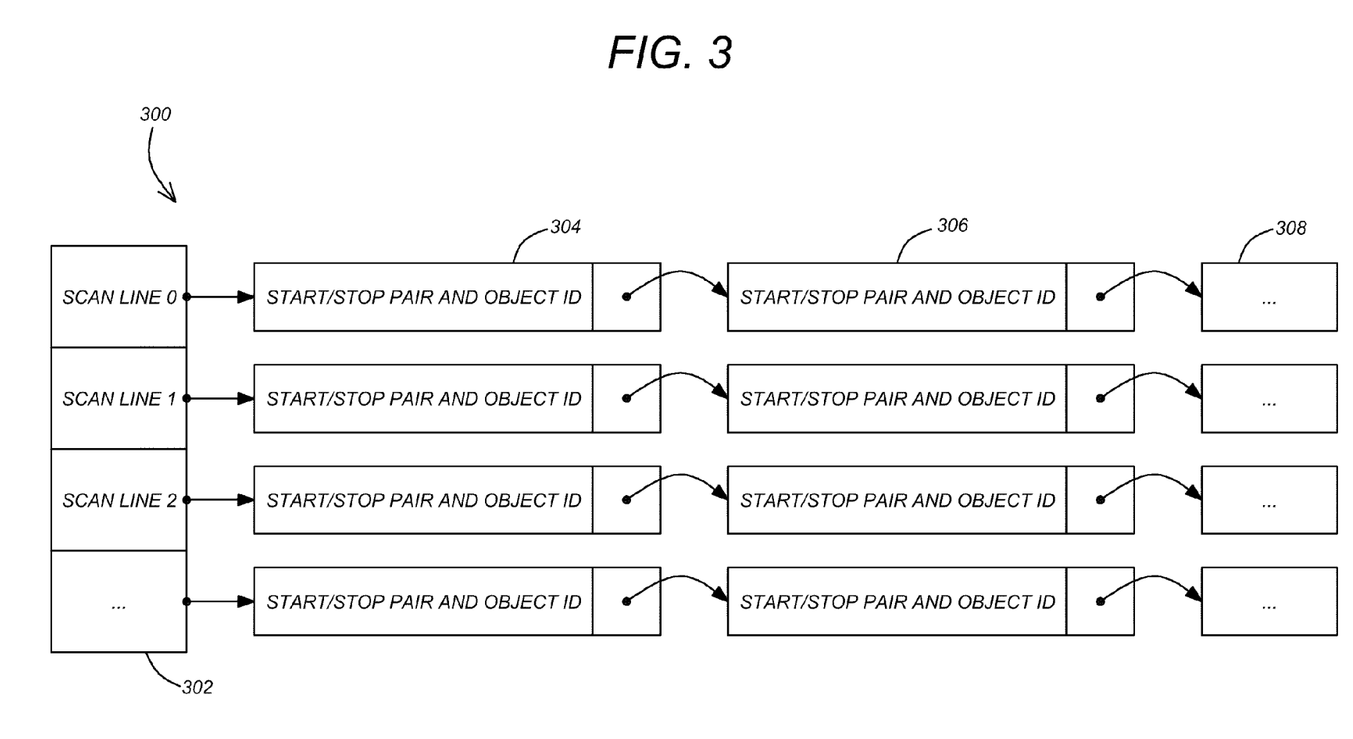
FIG. 3 illustrates an intermediate data structure that is used to perform hit testing in accordance with one or more embodiments of the invention.

To perform the hit testing, another intermediate data structure is created as illustrated in FIG. 3. The structure 300 is an array of scan line indexes. For each scan line index 302, the object IDs are stored with the start run, stop run pairs 304-308 (i.e., in the scan line index 302). When a user moves the mouse, hit testing is done using the y-mouse coordinate as a look up into the scan line index 302 returning the short list of run start and run stop pair (e.g., the list attached/mapped/stored with/linked to via the scan line index 302). The short list is then searched to find a pair where the x-mouse value is greater than the run start and less than the run stop value. The object ID is then read.

Figure 4:
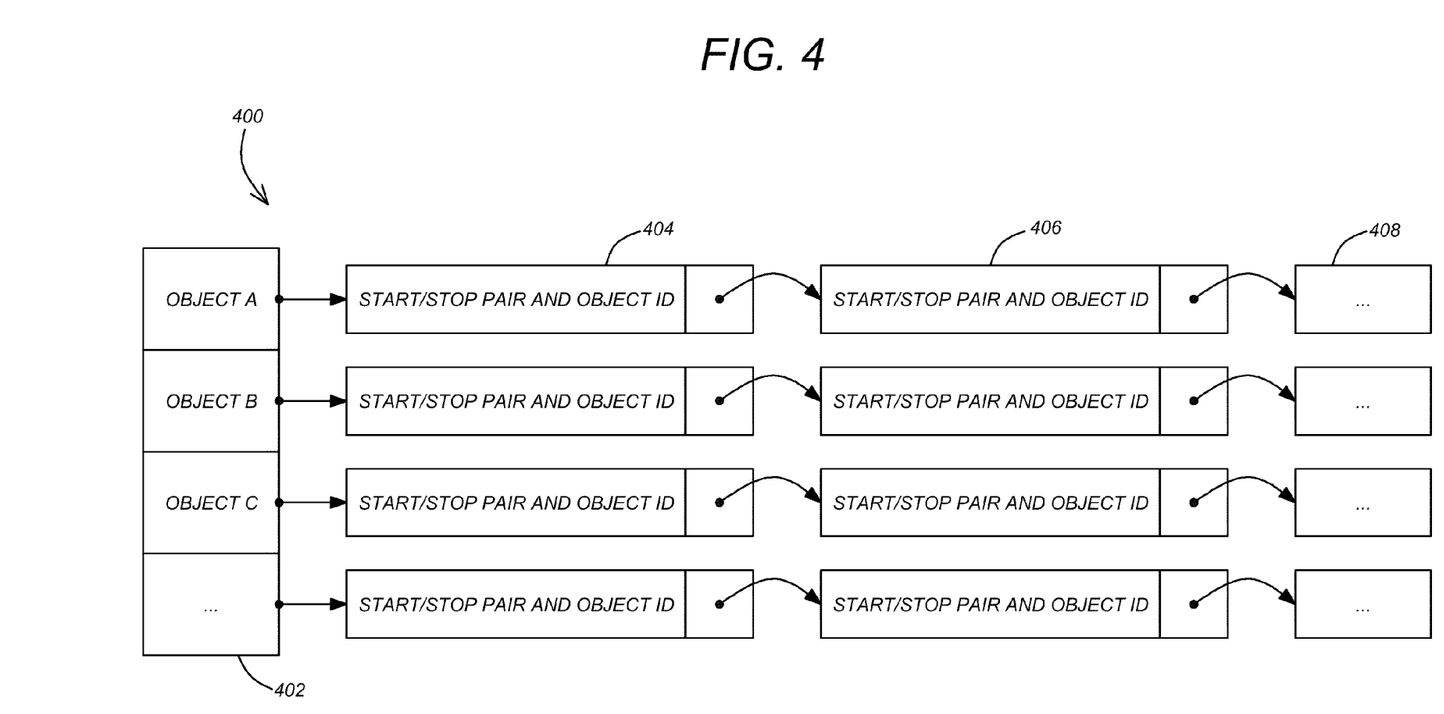
FIG. 4 illustrates an intermediate data structure that is used for highlighting objects in accordance with one or more embodiments of the invention.

FIG. 4 illustrates another data structure that is created for highlighting in accordance with one or more embodiments of the invention. An associative array 400 that maps objects IDs 402 to lists of start stop run pairs 404-408 is generated. These pairs 404-408 are different from the ones described above with respect to FIG. 3 because the pairs 404-408 of FIG. 4 include the y-value of the run. To highlight an object displayed in a browser/web application 208, the object ID is looked up in the associative array 400 (i.e., in the object id list 402) and the list of start stop run pairs 404-408 is found. For each of the found pair 404-408, a horizontal line is drawn (e.g., using the canvas hypertext markup language element, vector markup language [VML], or scalable vector graphics [SVG]) from the start of the run to the end. Such a horizontal line may be on a per pixel basis and serves to highlight a selected object or to display the selected object in a visually distinguishable manner (e.g., in a different color, in a darker tone, enlarged, etc.). Alternatively, rather than drawing a horizontal line, embodiments of the invention may display a tooltip, dialog window, or other graphical cue that serves to visually distinguish a selected object from other objects in the scene.

Figure 5A:
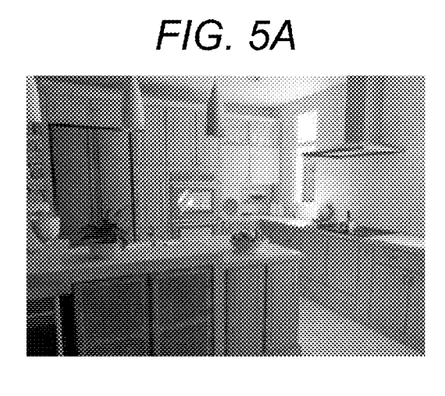
FIG. 5A illustrates a rendered 3D scene having multiple rendered objects in accordance with one or more embodiments of the invention.
Figure 5B:
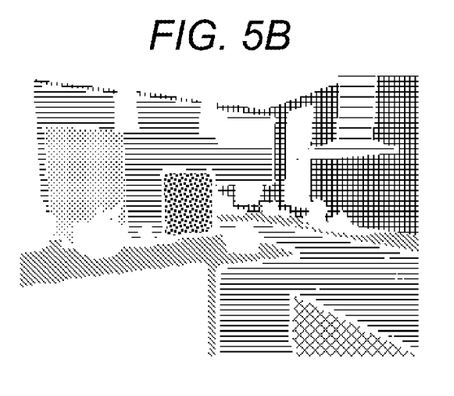
FIG. 5B illustrates a rendering of a scene selection buffer based on selected objects in accordance with one or more embodiments of the invention.
Figure 5C:
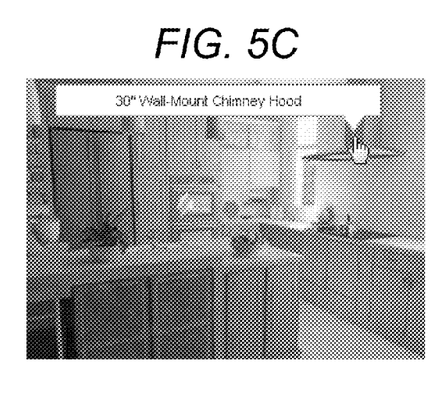
FIG. 5C illustrates the display of a tooltip when a user has hovered over a chimney hood object in accordance with one or more embodiments of the invention.
Figure 5D:
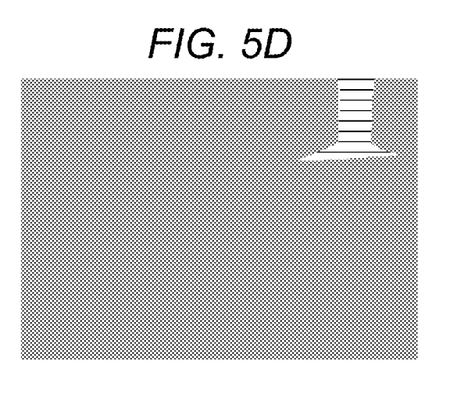
FIG. 5D illustrates the chimney hood part of an RLE selection buffer in accordance with one or more embodiments of the invention.

FIG. 5A illustrates a rendered 3D scene having multiple rendered objects in accordance with one or more embodiments of the invention. FIG. 5B illustrates a rendering of the scene selection buffer that illustrates each rendered object having the same hatch pattern in the scene selection buffer (i.e., the start run-stop run pairs are indicated by a particular hatch pattern). Accordingly, FIG. 5B illustrates the RLE encoded descriptions of all objects in the rendered scene. Once a user hovers over or clicks any of the objects, an event may be fired/triggered to initiate the execution of a custom action (e.g., the display of a tooltip or dialog box, highlighting in a different color, or some method to visually distinguish the object selected/hovered over). FIG. 5C illustrates the display of a tooltip when a user has hovered over a chimney hood object in accordance with one or more embodiments of the invention. FIG. 5D illustrates the chimney hood part of the RLE selection buffer in accordance with one or more embodiments of the invention.

Logical Flow

Figure 6:
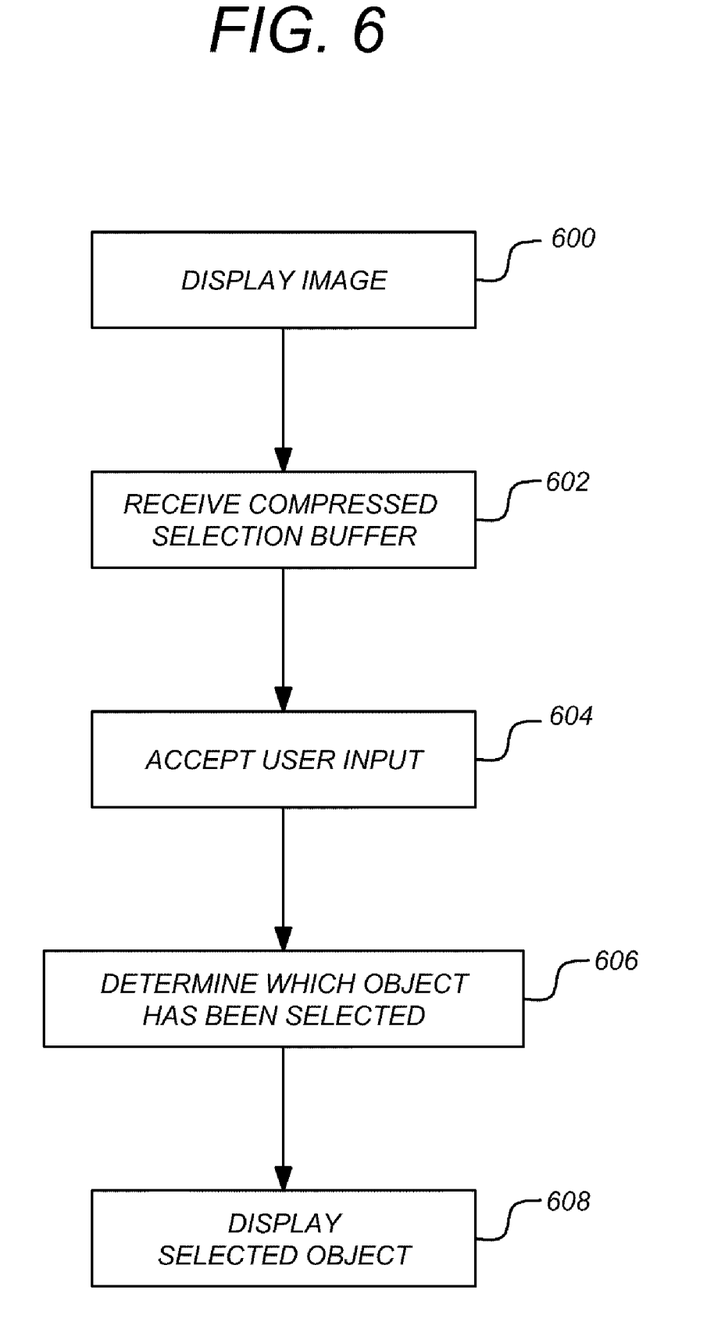
FIG. 6 is a flow chart illustrating the logical flow for selecting and highlighting an object in accordance with one or more embodiments of the invention.

FIG. 6 is a flow chart illustrating the logical flow for selecting and highlighting an object in accordance with one or more embodiments of the invention. At step 600, a rendered image is displayed in a client browser on a client computer. The rendered image contains one or more rendered objects.

At step 602, a run length encoded (RLE) selection buffer is received in the client buffer from a server across a network. The selection buffer includes a mapping of each pixel from the rendered image to one or more of the rendered objects. Such a selection buffer may be sent to the client browser using JavaScript Object Notation™ (JSON) object literal notation. Alternatively, the selection buffer may be sent using JavaScript Object Notation™ (JSON) arrays.

At step 604, input is accepted from a user (e.g., via a cursor control device). The input consists of a location of the cursor with respect to the rendered image (e.g., an [x,y] coordinate). Such input may further include the hovering of a cursor over an object, the activation of a selection capability (e.g., clicking a mouse button or tapping a stylus, etc.).

At step 606, a determination is made (in the browser/client computer) regarding which one of the rendered objects has been selected. Such a determination is based on the user input and the RLE selection buffer.

The determination regarding which object has been selected may include the use of an intermediate data structure. Accordingly, a first array of scan line indices may be created (in the client browser/computer). Each scan line index represents a scan line of the rendered image and includes (or mapped to) one or more pairs of start run-stop run x-values with each pair mapped to an object identification for one of the rendered objects that is located on the scan line within the start run-stop run x-value of that pair. In other words, for each scan line, the start run-stop run pairs in that scan line are listed along with an object ID for each pair. The index to select a particular scan line is a y-value coordinate and the start run-top run pair index is the x-value coordinate.

A determination is made regarding the x-value coordinate and y-value coordinate from the user input. The scan line index corresponding to the y-value coordinate from the user input is determined. Each scan line index is searched for a selected start run-stop run pair that contains the x-value coordinate (i.e., that has a start run less than the x-value coordinate and a stop run greater than the x-value coordinate). Once the corresponding pair has been identified, it is understood that the object mapped to that pair has been selected by the user. Accordingly, the object identification that is mapped to the selected start run-stop run pair is read.

At step 608, the selected rendered object is displayed in a visually distinguishable manner (e.g., in a different color, different tone, highlighted, display of a tooltip, dialog window, etc.). Such a display sequence may include the highlighting of the selected object. To highlight or visually distinguish a selected object, a second data structure may be utilized. Accordingly, at the client computer, a second array may be created that consists of object identifications (for each of the rendered objects) mapped to one or more lists of start run-stop run pairs of (x,y) coordinate values reflecting where each object is located on the rendered image.

The object identification read from the first data structure during step 606 is then used as an index into the second array to obtain a found list of start run-stop run pairs (i.e., all of the pairs that contain the selected object). For each start run-stop run pair in the found list, a horizontal line may be drawn from the start run to the stop run in the rendered image. Such a horizontal line is drawn in a manner that visually distinguishes the rendered object corresponding to the read object identification from rendered objects not selected by the user. Alternatively, rather than drawing a horizontal line, a tooltip, dialog window, or other mechanism may be used to visually distinguish a particular object.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for selecting objects, comprising:
    (a) displaying in a client browser on a client computer, a rendered image containing one or more rendered objects;
    (b) receiving, from a server across a network, in the client browser, an already created run length encoded (RLE) selection buffer, wherein the selection buffer comprises a mapping of each pixel from the rendered image to one or more object identifiers corresponding to one or more of the one or more rendered objects;
    (c) accepting, from a cursor control device at the client computer, user input comprising a location of the cursor control device with respect to the rendered image;
    (d) determining, on the client computer, which of the one or more rendered objects has been selected based on the user input and the RLE selection buffer; and
    (e) displaying, in the client browser, the selected rendered object in a visually distinguishable manner wherein the displaying object in a visually distinguishable manner is associated with an associative array comprising one or more object identifications for each of the rendered objects, wherein each object identification is mapped to one or more lists of start run-stop run pairs of x,y coordinate values.

2. The method of claim 1, wherein the determining which of the one or more rendered objects has been selected comprises:
    (a) creating, in the client computer a first array of scan line indices wherein each scan line index:
        (i) represents a scan line of the rendered image; and
        (ii) comprises one or more pairs of start run-stop run x-values with each pair mapped to an object identification for one of the rendered objects that is located on the scan line within the start run-stop run x-value of that pair;
    (b) determining an x-value coordinate and a y-value coordinate from the user input;
    (c) determining the scan line index corresponding to the y-value coordinate;
    (d) searching the determined scan line index for a selected start run-stop run pair having a start run that is less than the x-value coordinate and a stop run that is greater than the x-value coordinate; and
    (e) reading the object identification that is mapped to the selected start run-stop run pair.

3. The method of claim 2, wherein the displaying of the selected
    rendered object in a visually distinguishable manner further comprises:
    (a) creating, the associative array reflecting where each object is located on the rendered image;
    (b) looking up the read object identification in the second array to obtain a found list of start run-stop run pairs; and
    (c) for each start run-stop run pair in the found list, drawing a horizontal line from the start run to the stop run in the rendered image.

4. The method of claim 3, wherein the horizontal line is drawn in a manner that visually distinguishes the rendered object corresponding to the read object identification from rendered objects not selected by the user.

5. The method of claim 1, wherein the selection buffer is sent to the client browser using JavaScript Object Notation™ (JSON) object literal notation.

6. The method of claim 1, wherein the selection buffer is sent to the client browser using JavaScript Object Notation™ (JSON) arrays.

7. An apparatus for selecting objects in a computer system comprising:
    (a) a client computer having a memory; and
    (b) a browser application executing on the client computer, wherein the browser application is configured to:
        (i) display in the client browser, a rendered image containing one or more rendered objects;
        (ii) receive, from a server across a network, in the client browser, an already created run length encoded (RLE) selection buffer, wherein the selection buffer comprises a mapping of each pixel from the rendered image to one or more object identifiers corresponding to one or more of the one or more rendered objects;
        (iii) accept, from a cursor control device, user input comprising a location of the cursor control device with respect to the rendered image;
        (iv) determine which of the one or more rendered objects has been selected based on the user input and the RLE selection buffer; and
        (v) display, in the client browser, the selected rendered object in a visually distinguishable manner
    wherein the displaying object in a visually distinguishable manner is associated with an associative array comprising one or more object identifications for each of the rendered objects, wherein each object identification is mapped to one or more lists of start run-stop run pairs of x,y coordinate values.

8. The apparatus of claim 7, wherein the browser application is configured to determine which of the one or more rendered objects has been selected by:
    (a) creating, in the client computer a first array of scan line indices wherein each scan line index:
        (i) represents a scan line of the rendered image; and
        (ii) comprises one or more pairs of start run-stop run x-values with each pair mapped to an object identification for one of the rendered objects that is located on the scan line within the start run-stop run x-value of that pair;
    (b) determining an x-value coordinate and a y-value coordinate from the user input;
    (c) determining the scan line index corresponding to the y-value coordinate;
    (d) searching the determined scan line index for a selected start run-stop run pair having a start run that is less than the x-value coordinate and a stop run that is greater than the x-value coordinate; and
    (e) reading the object identification that is mapped to the selected start run-stop run pair.

9. The apparatus of claim 8, wherein the browser application is
    configured to display the selected rendered object in a visually distinguishable manner by:
    (a) creating, the associative array reflecting where each object is located on the rendered image;

(b) looking up the read object identification in the second array to obtain a found list of start run-stop run pairs; and (c) for each start run-stop run pair in the found list, drawing a horizontal line from the start run to the stop run in the rendered image.

10. The apparatus of claim 9, wherein the horizontal line is drawn in a manner that visually distinguishes the rendered object corresponding to the read object identification from rendered objects not selected by the user.

11. The apparatus of claim 7, wherein the selection buffer is sent to the client browser using JavaScript Object Notation™ (JSON) object literal notation.

12. The apparatus of claim 7, wherein the selection buffer is sent to the client browser using JavaScript Object Notation™ (JSON) arrays.

13. A non-transitory computer readable storage medium encoded with computer program instructions which when accessed by a computer cause the computer to load the program instructions to a memory therein creating a special purpose data structure causing the computer to operate as a specially programmed computer, executing a method of selecting an object, comprising:

(a) displaying in a client browser of the specially programmed computer, a rendered image containing one or more rendered objects;

(b) receiving, from a server across a network, in the client browser of the specially programmed computer, an already created run length encoded (RLE) selection buffer, wherein
the selection buffer comprises a mapping of each pixel from the rendered image to one or more object identifiers corresponding to one or more of the one or more rendered objects;

(c) accepting, from a cursor control device at the specially programmed computer, user input comprising a location of the cursor control device with respect to the rendered image;

(d) determining, on the specially programmed computer, which of the one or more rendered objects has been selected based on the user input and the RLE selection buffer; and (e) displaying, in the client browser of the specially programmed computer, the selected rendered object in a visually distinguishable manner
wherein the displaying object in a visually distinguishable manner is associated with an associative array comprising one or more object identifications for each of the rendered objects, wherein each object identification is mapped to one or more lists of start run-stop run pairs of x,y coordinate values.

14. The computer readable storage medium of claim 13, wherein the determining which of the one or more rendered objects has been selected comprises:

(a) creating, in the specially programmed computer, a first array of scan line indices wherein each scan line index:
(i) represents a scan line of the rendered image; and
(ii) comprises one or more pairs of start run-stop run x-values with each pair mapped to an object identification for one of the rendered objects that is located on the scan line within the start run-stop run x-value of that pair;

(b) determining an x-value coordinate and a y-value coordinate from the user input; (c) determining the scan line index corresponding to the y-value coordinate;

(d) searching the determined scan line index for a selected start run-stop run pair having a start run that is less than the x-value coordinate and a stop run that is greater than the x-value coordinate; and (e) reading the object identification that is mapped to the selected start run-stop run pair.

15. The computer readable storage medium of claim 14, wherein the displaying of the selected rendered object in a visually distinguishable manner comprises:

(a) creating, the associative array reflecting where each object is located on the rendered image;

(b) looking up the read object identification in the second array to obtain a found list of start run-stop run pairs; and (c) for each start run-stop run pair in the found list, drawing a horizontal line from the start run to the stop run in the rendered image.

16. The computer readable storage medium of claim 15, wherein the horizontal line is drawn in a manner that visually distinguishes the rendered object corresponding to the read object identification from rendered objects not selected by the user.

17. The computer readable storage medium of claim 13, wherein the selection buffer is sent to the client browser using JavaScript Object Notation™ (JSON) object literal notation.

18. The computer readable storage medium of claim 13, wherein the selection buffer is sent to the client browser using JavaScript Object Notation™ (JSON) arrays.

* * * * *